US008571190B2

(12) United States Patent
Erb

(10) Patent No.: US 8,571,190 B2
(45) Date of Patent: Oct. 29, 2013

(54) INCOMING CALLER INFORMATION ON SELF-LABELING TELEPHONE KEYS

(75) Inventor: Paul Andrew Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 968 days.

(21) Appl. No.: 11/753,696

(22) Filed: May 25, 2007

(65) Prior Publication Data

US 2007/0280449 A1 Dec. 6, 2007

(30) Foreign Application Priority Data

May 30, 2006 (EP) .................................... 06114731

(51) Int. Cl.
*H04M 1/56* (2006.01)
(52) U.S. Cl.
USPC ............. 379/142.17; 379/142.06; 379/88.21; 379/93.23; 455/415
(58) Field of Classification Search
USPC ............. 379/142.01, 142.04, 142.06, 142.17, 379/88.2, 88.21, 93.23; 455/415, 463, 566
See application file for complete search history.

(56) References Cited

U.S. PATENT DOCUMENTS 6,757,372 B1 * 6/2004 Dunlap et al. ........... 379/142.17
7,068,775 B1 * 6/2006 Lee .......................... 379/265.02
2002/0031211 A1 3/2002 Fullarton et al.
2004/0141599 A1 7/2004 Tang et al.
2005/0031116 A1 2/2005 Lederer et al.
2005/0273814 A1 * 12/2005 Heughebaert et al. .......... 725/43
2007/0047519 A1 * 3/2007 Bangor et al. ................ 370/352

FOREIGN PATENT DOCUMENTS

WO WO 00/25464 5/2000
WO WO2005/055570 6/2005

OTHER PUBLICATIONS

European Search Report from corresponding European Application No. EP06114731.
Keating, Tom: "ShoreTel 6.1 New IP-PBX Features", VOIP & Gadgets Blog, [Online], May 25, 2006, pp. 1-4, XP002401609. http://blog.tmcnet.com/blog/tom-keating/voip/shoretel-61-new-ippbx-features.asp.

\* cited by examiner

*Primary Examiner* — Antim Shah

(57) ABSTRACT

A communication system, comprising at least one telephone appliance having multiple line appearances selectable via associated self-labeling line buttons, and a switch for receiving an incoming call intended for a particular one of the line appearances and in response generating a message containing predetermined information and an indication of an associated one of the line buttons, whereupon the predetermined information is displayed in abbreviated format on the associated self-labeling line button.

12 Claims, 7 Drawing Sheets

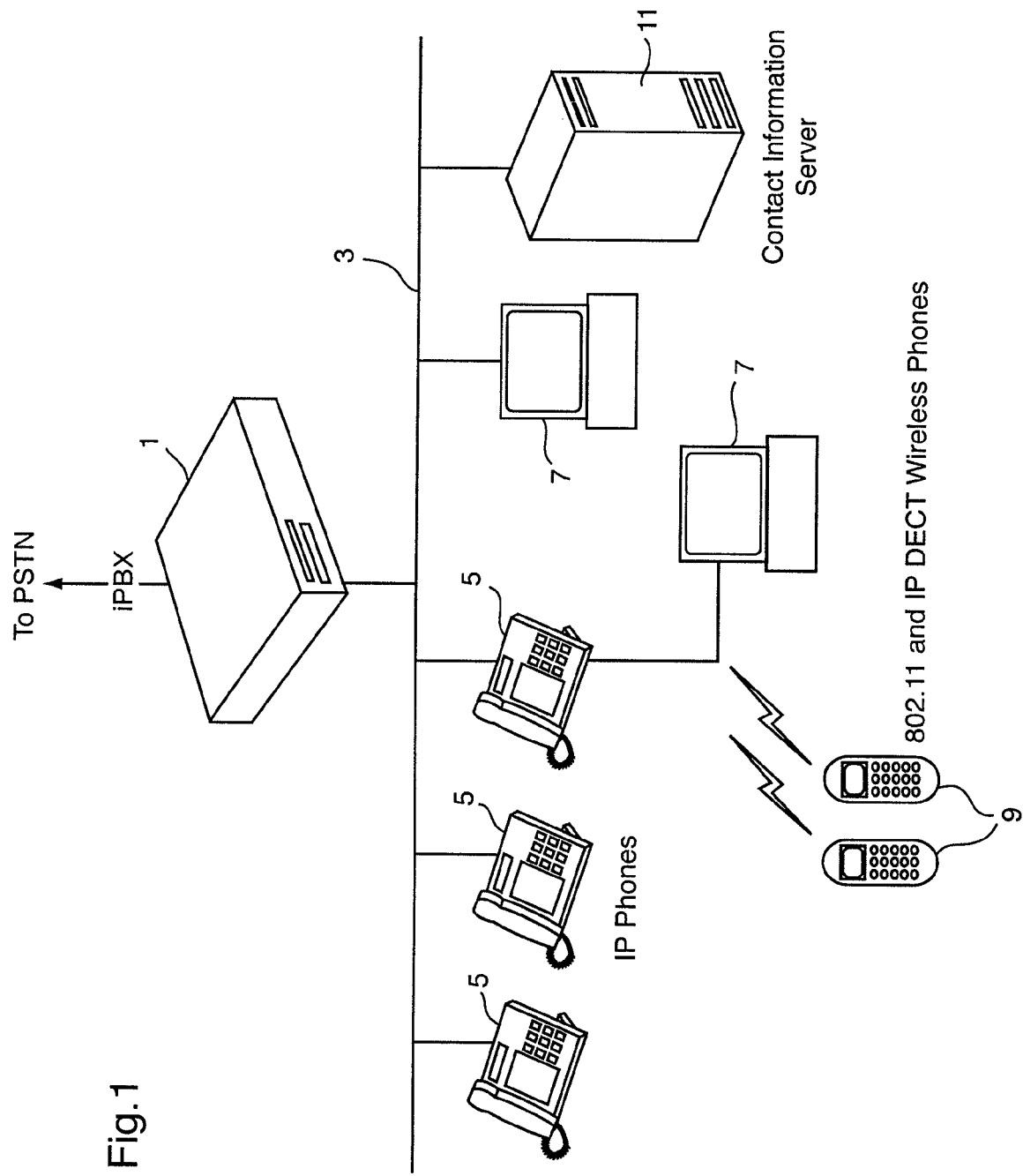

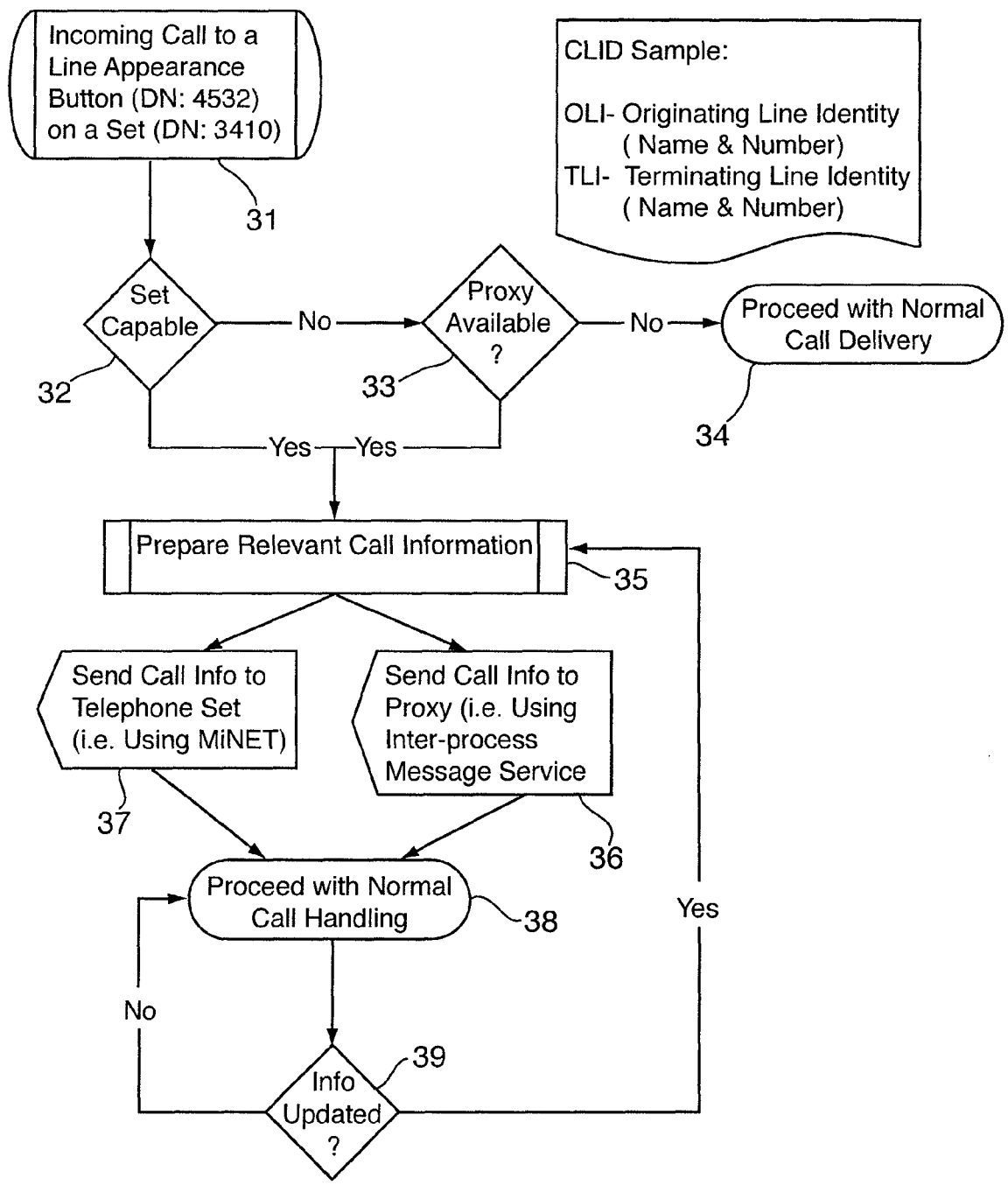

INCOMING CALLER INFORMATION ON SELF-LABELING TELEPHONE KEYS

CROSS-REFERENCE TO RELATED PATENT APPLICATION

This application claims priority under 35 U.S.C. §119 from European Patent Application No. 06114731.0, filed on May 30, 2006, the disclosure of which is hereby incorporated by reference herein as if set forth in its entirety.

BACKGROUND OF THE INVENTION

1. Field of the Invention

The present invention is directed to communication systems, and more particularly to the presentation of information on a telephone appliance.

2. Description of the Related Art

When an incoming call is presented to a telephone appliance, it is known in the art to display call information (e.g. caller name and/or number) on the appliance. For example, a telephone display may be updated to provide Caller Line Identification (CLID) information that, in conjunction with softkeys, may be utilized to handle an incoming call. It is also known in the art to display CLID information based on device class of service (COS), when an incoming call is presented on a line appearance (ringing line). However according to the prior art, the presentation of CLID information on the telephone display is limited via call control to one incoming call regardless of the number of incoming calls to the telephone appliance (i.e. the telephone appliance always shows the most recent call that is still ringing), and is presented at a common display area (e.g. LCD display screen).

When more than one call is presented to the telephone appliance, the common display area is updated with the new call information. If the call is to another line appearance on the telephone appliance then, subject to system configuration, the new call information may replace the previous call information. Only call information relating to a single line appearance is presented to a user at a time, regardless of the number of calls being presented (or active) to the user's telephone.

In order to answer a previously presented call whose information has been updated by a more recent call, the user may select the earlier incoming call (or the recalling call, held call, etc.) based on flash rate and/or colour associated with the flashing line button for the previously presented call on the user's telephone, or by the relative importance of the directory number (DN) associated with the line button (if known by the user), and/or based on the user's recollection of call information that may have been displayed previously. Alternatively, call control may be configured to allocate priorities to different call types and to display call information based on relative priority. Also, it is known to provide a "ringing line select" feature that allows a user to go off-hook and have call control automatically determine which line to select.

SUMMARY OF THE INVENTION

It is an aspect of the present invention to provide call related information for each active line button available to the user rather than limiting the presentation of call information only to the call processing display area of a telephone appliance, as is done in the prior art. It is a further aspect of the invention to present to a user at a telephone appliance, information that is supplemental to the call related information.

Therefore, according to an aspect of the invention, a system and method are provided for sending a message from call control to the telephone appliance (in addition to, or as an alternative to, CLID information), that contains additional information. The information is initially displayed in an abbreviated format (e.g. as a label) but may be displayed in full when selected by an application within the telephone appliance (referred to herein as "more info service"). In one embodiment, the abbreviated format information (e.g. label) is presented in association with a line button.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a block diagram of an exemplary communication system forming the environment of the present invention;

FIG. 3 is a flowchart showing method steps within call control of the communication system of FIG. 1 for delivering initial call information to the telephone appliance of FIG. 2;

DETAILED DESCRIPTION OF THE PREFERRED EMBODIMENTS

With reference to FIG. 1, an exemplary communication system is shown comprising a communication switch such as an IP PBX, otherwise known as an iPBX 1 (e.g. Mitel 3300 ICP or Mitel SX-200 ICP) connected to a local area network (Ethernet LAN 3) and to the Public Switched Telephone Network (PSTN). A plurality of telephone appliances such as IP phones 5 and desktop computers 7 running phone applications, etc., are connected to the LAN 3, as well as wireless phones 9 and an application server 11, such as a contact information server.

A person of skill in the art will appreciate that the configuration of FIG. 1 is representative of a typical converged communication network, and that numerous variations in configuration, components, etc. are possible.

Figure 2A:
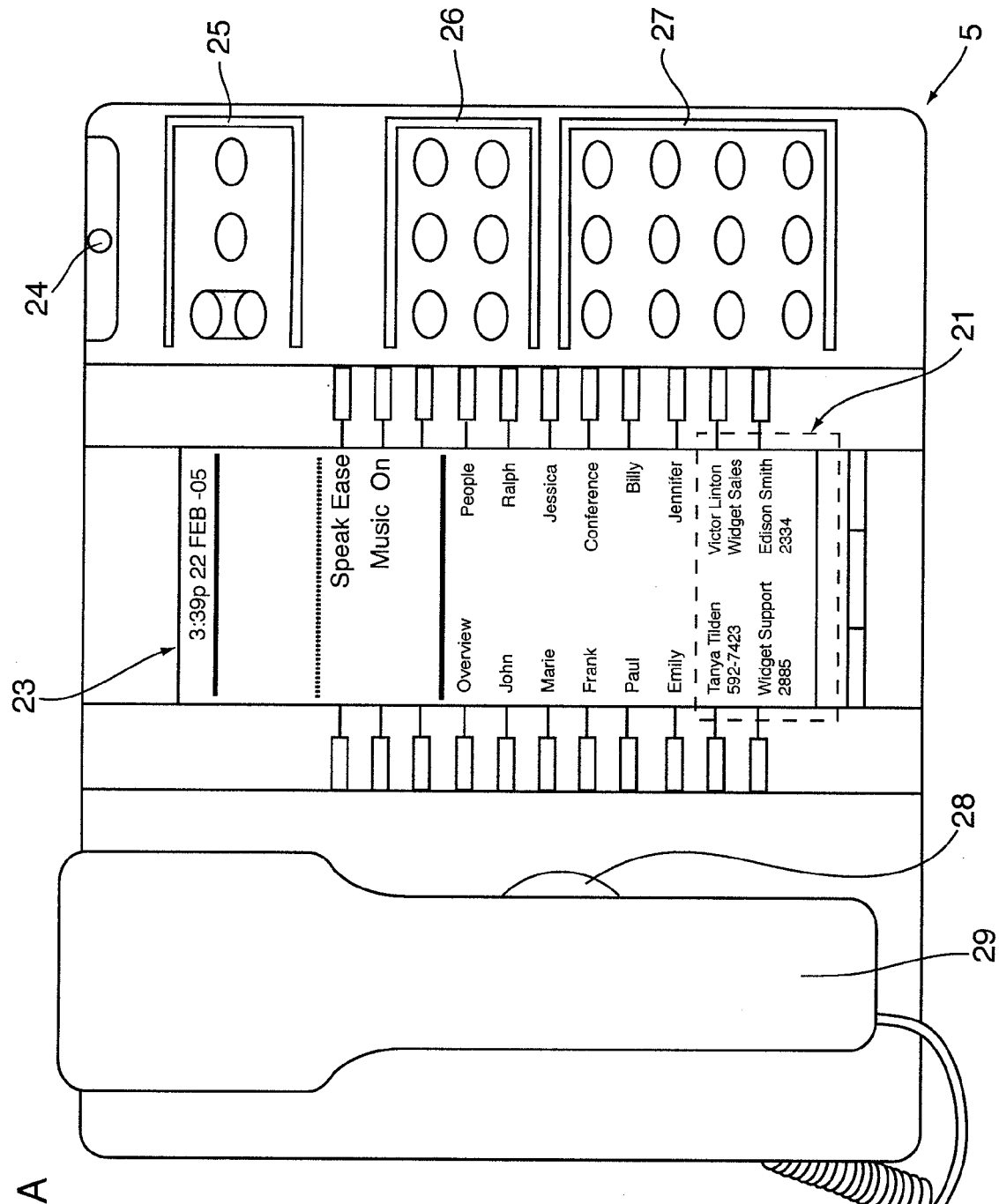
FIGS. 2A and 2B show an exemplary telephone appliance in an idle state and when providing a "more info service", respectively, in accordance with an aspect of the present invention.
Figure 2B:
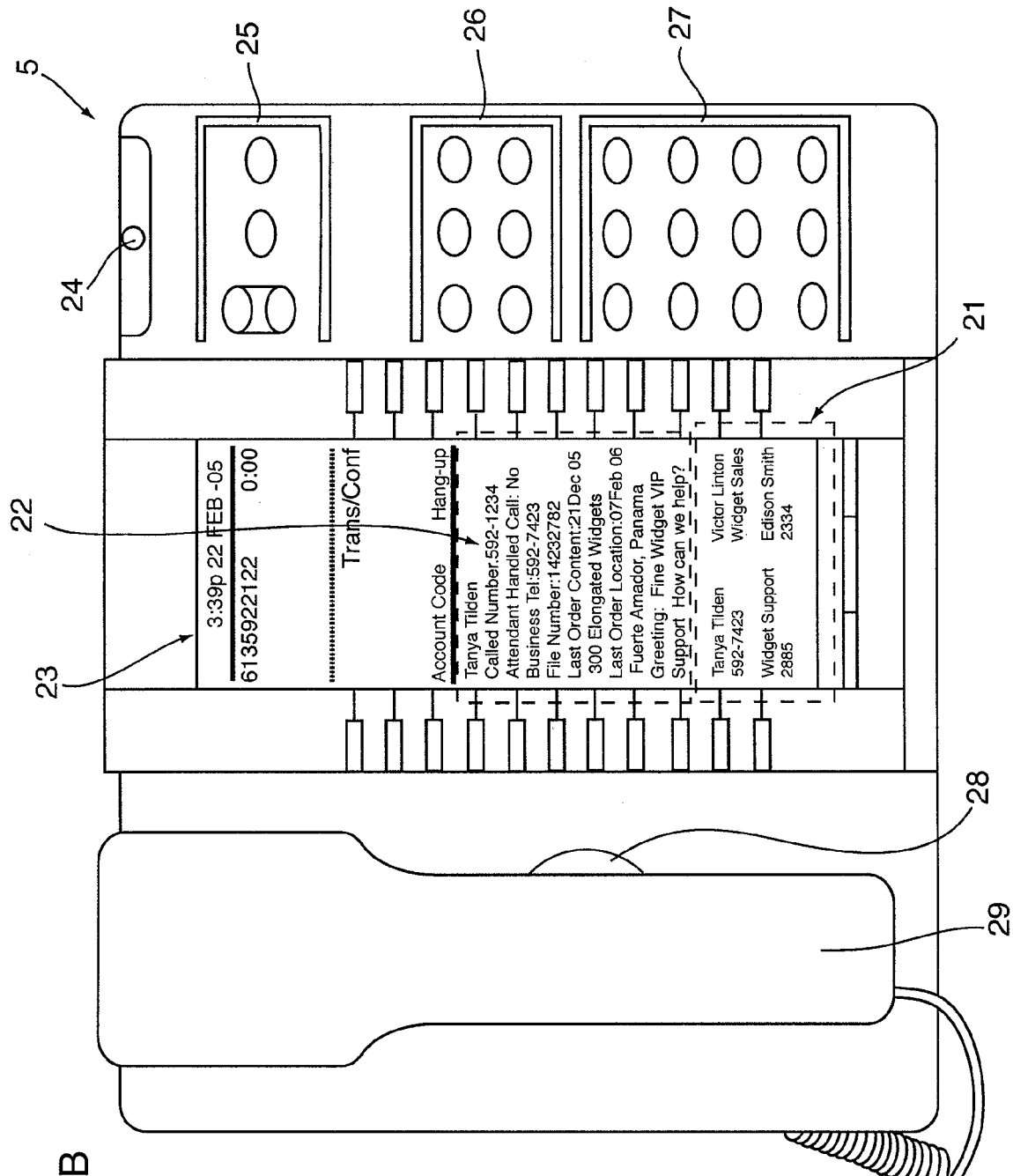

With reference to FIGS. 2A and 2B, an IP phone 5 is shown in accordance with an aspect of the invention having a plurality of self-labeling line buttons (i.e. the self-labeling line buttons shown within stippled line box 21) forming part of a central display 23. In addition, the phone includes conventional features such as: ring/message indicator 24; volume, speaker and mute controls 25; several fixed function keys 26 including, for example, a "Superkey" for providing user access to additional menus on display 23, cancel, redial, hold, transfer/conference, message keys, etc.; a keypad 27; hands-free speaker 28, and handset 29.

In operation, upon receipt of an incoming call from the PSTN to one of the IP phones 5, it is conventional for call control software within iPBX 1 to send a message containing CLID information for display on the phone. However, as discussed in greater detail below, according to an aspect of the present invention, call control sends a message to the phone containing relevant call information (e.g. in a proprietary application such as a MiNET message, SIP or similar mechanism) for display in an abbreviated format (such as a label "Tanya Tilden 592-7423" on a self-labeling line button 21).

The call information is then sent as a message from the iPBX 1 to the phone 5 (step 37) or relevant proxy (step 36). The call information message is, according to an exemplary embodiment of the invention, an Application Interface message (e.g. a message sent in accordance with the Mitel proprietary MiNET messaging protocol), with the format set forth in Table A, as follows:

TABLE A

| Field Name | # of Octets | Description |
| --- | --- | --- |
| MT Code | 1 | Application Interface Message . . . 0x90 |
| TAG | 1 | CLID data Message . . . 0x02 |
| Data Length | 1 | Number of data octets following |
| Button Number | 1 | Line number or key # that the call is coming in on (e.g. Button 6) |
| Call Info Type | 1 | Indicates type of information included: 1-new, 2-update, 3-obsolete |
| CLID Digit size | 1 | Specifies number of digits in CLID up to a maximum of 26. |
| CLID digit string | Up to 26 | This is an ASCII string containing diallable digits "0 . . . 9, *, #" (e.g. 5927423) |
| CLID Name length, First | 1 | Specifies number of characters in Name string for the first name (e.g. 5) |
| CLID Name length, Middle | 1 | Specifies number of characters in Name string for the middle name (e.g. 0) |
| CLID Name length, Last | 1 | Specifies number of characters in Name string for the last name (e.g. 6) |
| CLID Name string | Fixed Limit or Variable Length | The combined Name string including First, Middle(s) and Last names (maximum total of 30) (e.g. Tanya Tilden) |

The information may also displayed in full on the main display 23 of the phone when selected by an application within the phone (the "more info service" discussed in greater detail below), as shown within stippled line box 22 illustrated in FIG. 2B.

Turning to FIG. 3, in the event of an incoming call (step 31) to a particular line appearance on a phone 5 (e.g. a line appearance identified by DN: 4532 on a phone identified by DN: 3410), the phone (or phone proxy) and iPBX 1 exchange one or more messages to determine whether the phone is capable of displaying label information (step 32), or whether a phone proxy representing the phone within the network, is available on the iPBX 1 for displaying label information (step 33). Alternatively, if call control already knows that the phone is compatible then no message exchange is required. If the phone is not capable of displaying label information, the call proceeds in a conventional manner (step 34) where CLID information is presented on the central display 23 of the phone (if the phone is so equipped).

If the phone is capable of displaying label information on its line buttons 21 (or a phone proxy is available for doing so), then call control creates one or more further messages (step 35) using CLID information (e.g. OLI—Originating Line Identity (Name & Number)) and/or TLI—Terminating Line Identity (Name & Number), button DN (e.g. 4532), telephone DN (e.g. 3410). Moreover, according to an alternative embodiment the phone 5 (or phone proxy) may obtain additional information regarding the OLI and/or TLI via an additional message exchange with the contact information server 11 (e.g. an initial greeting, order status and purchase history), and display such additional information within a graphical window 22 on the main phone display 23 as shown in FIG. 2B. The phone 5 (or phone proxy) may also use configuration options to determine relative priority of information to display (particularly with respect to the abbreviated data presented on the labels 21 (e.g. OLI first, TLI second, then contact information server data).

Upon receipt of the call information from iPBX 1, the label of the associated line button 21 at phone 5 is updated to display an abbreviated form of the call information using self-labeling keys such as provided, for example, on Mitel 5330, 5340, 5325 and Web telephones of Mitel Networks Corporation. However, if an information update is indicated in the message (step 39), an information update procedure is executed as discussed in greater detail below with reference to FIG. 6. Call processing then proceeds as usual (step 38).

Figure 4:
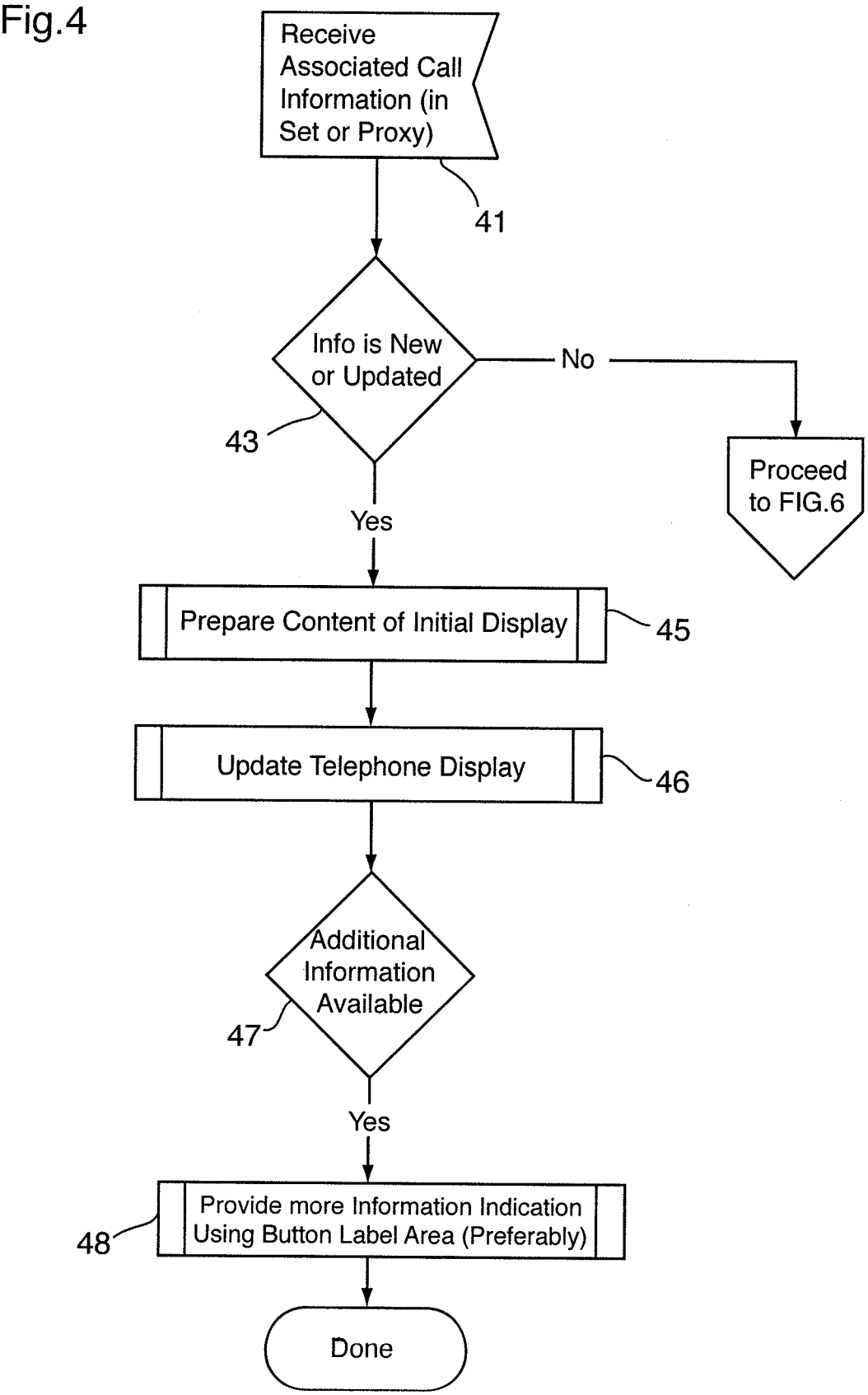
FIG. 4 is a flowchart showing method steps for displaying the initial call information at the telephone appliance of FIG. 2.
Figure 6:
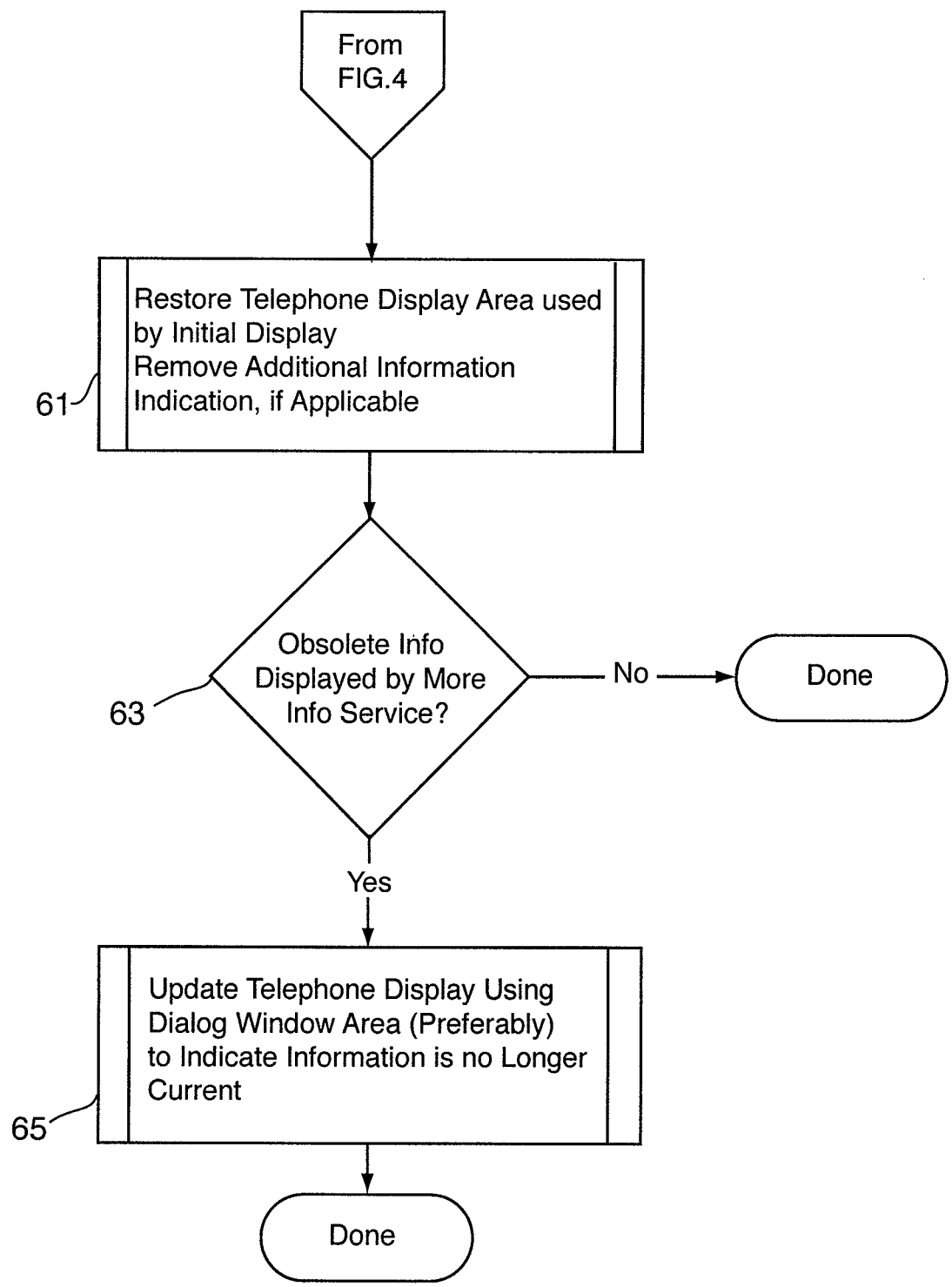
FIG. 6 is a flowchart showing method steps for removing/updating call information delivered to the telephone appliance of FIG. 2.

With reference to FIG. 4, upon receipt of the message (step 41) at the telephone appliance 5 (or proxy), and if the "Call Info Type" indicates new or updated information (step 43), then the content of the initial display is prepared (step 45) using one or more of display area available, and user preferences (e.g. preferred button, prioritizing display of caller name, caller number, originally dialed digits, etc.), and the initial call information is then displayed (step 46). Otherwise, if the "Call Info Type" indicates 'obsolete' information then the steps of FIG. 6 are executed.

Preferably, the information is displayed on a self-labeling button 21. Optionally, an ellipsis or icon indication may be displayed in addition to, or instead of, the abbreviated call information in order to indicate availability of additional call related information (steps 47 and 48). The indication may also be provided in the call processing display area 23 and/or by illuminating the associated button 21 with a different colour (i.e. via an indicator LED).

Figure 5:
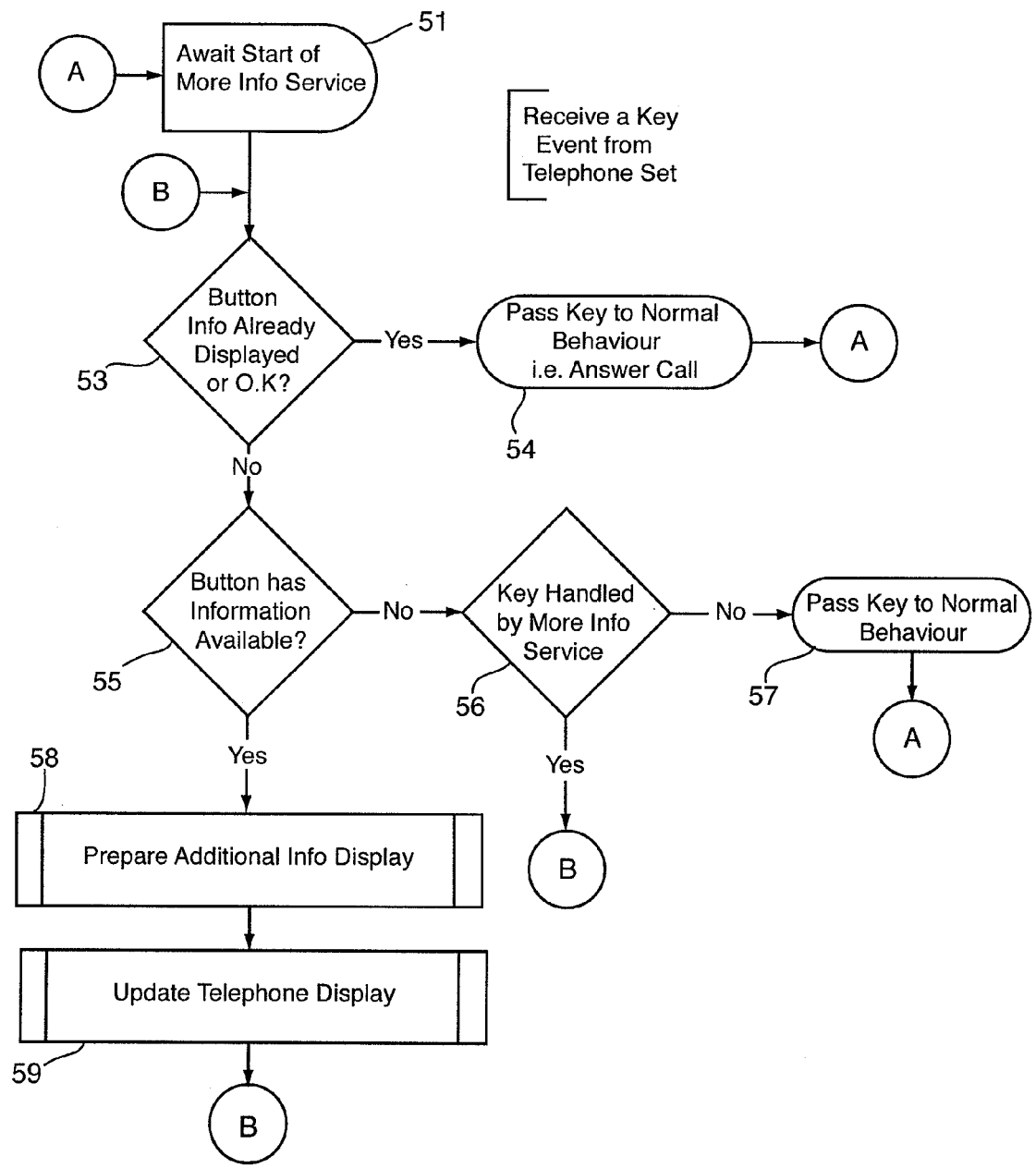
FIG. 5 is a flowchart showing method steps for delivering additional information to the telephone appliance of FIG. 2.

As shown in FIG. 5, the "more info Service" process waits for a user key input (step 51), such as the user pressing a designated hard key on the telephone 5 and/or feature key for answering the call. If all of the call information is already displayed (step 53), then call control assigns normal behaviour to the key (step 54), and the "more info service" awaits further user input (step 51). Selecting a different line button results in the "more info" service updating the dialog window with information for the selected line button. Pressing the same line button again results in dismissal of the "more info"

service (i.e. removes the dialog window and restores the telephone appliance display to normal) and also answers the call. Similarly, pressing any other hardkey/feature key/etc., other than another line button, results in dismissal of the "more info service" and performs the operation associated with the key that has been pressed.

The "more info service" presents a dialog window or similar mechanism 22 that uses more of the telephone appliance display than is normally available, as shown in FIG. 2B. If no additional call information is available (step 55) and the key has been allocated by call control to handle "more info service" (step 56), then call control awaits further user input (step 51). On the other hand, if the key has not been allocated to handle "more info service" then call control assigns normal behaviour to the key (step 57), and the "more info service" awaits further user input (step 51).

Selecting a line button when additional call information is available (step 55) causes call control to prepare additional information to display (step 58), using information associated with the selected button 21 (i.e. information obtained from contact server 11, as discussed above) and, optionally, user preferences. Next, the dialog window 22 is updated to present all available call related information (i.e. the initial call related information displayed on the line button 21 as well as additional information such as called number, whether or not the call was attendant handled, important information concerning the topic of the call, a greeting (e.g. "Fine Widget VIP Support. How can we help?), etc. Additional call information that may be included and presented by the "more info service" includes, but is not limited to: call forwarding/redirection history, language of the incoming caller (if available), dialog to use when answering the call (e.g. "Hello, Mr. Johnston, your car is ready").

In the event the Call Into Type indicates 'obsolete' information (step 43), the portion of the telephone display for the associated self labeling key 21 is restored to its initial condition (step 61 of FIG. 6). If the obsolete info is displayed by the "more info service" then the telephone display is updated to indicate that the information is no longer current (step 65) and the process terminates. If the obsolete information is not displayed by the "more info service" then the process terminates.

The present invention has been described with respect to a preferred embodiment. Other embodiments, variations and applications of the invention are possible. For example, as discussed above, the relevant call information can be stored and displayed on behalf of the telephone appliance by a proxy application (within the PBX or by a PC based application) instead of an application within the telephone appliance. A touch screen telephone (e.g. Mitel 5235) may also present a selectable icon (e.g. a question mark in a circle) such that touching the icon initiates the "more info service". Likewise, the selectable icon may be programmed to support dismissal of the service. A telephone appliance that does not support self labeling keys can use the call processing display area 23 to present call information displayed by the "more info service". The "more info service" may also be initiated by pressing a 'Superkey' button such as found on Mitel telephone appliances, followed by a line button with additional call information. The principles of the present invention may also be applied to the presentation of non-call associated information (e.g. ACD threshold alerts and queue status).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A system, comprising:
   a communication switch for receiving an incoming call and in response generating a message containing caller identification information and call history information related to said call and a directory number for an intended line appearance; and
   at least one telephone appliance having multiple line appearances selectable via associated self-labeling line buttons, for receiving said message from said communication switch and in response displaying said caller identification information at one of said self-labeling line buttons associated with the directory number for said intended line appearance, wherein pressing a user input key of said at least one telephone appliance displays said call history information at one of said self-labeling line buttons associated with the directory number for said intended line appearance,
   wherein said caller identification information and said call history information is displayed prior to a user answering the call and according to preferences set by said user including an order of data to be displayed within each of the displayed informations for the call,
   wherein said at least one telephone appliance includes a main display for displaying an indication of availability of said call history information, and displaying said call history information on said main display in response to user selection of said indication of availability.

2. The system of claim 1, wherein said communication switch comprises an IP-based PBX connected to the Public Switched Telephone Network (PSTN) and via a local area network to said at least one telephone appliance.

3. The system of claim 1, wherein pressing said user input key a second time removes said remainder of said predetermined information.

4. A method of displaying predetermined information on a particular line appearance of a telephone appliance, comprising:
   generating a message containing said information and an indication of said line appearance; and
   receiving said message at said telephone appliance and in response displaying a first portion of said information at a self-labeling line button associated with said particular line appearance, said first portion being caller identification information;
   pressing a user input key of said telephone appliance displaying a remainder of said information at a self-labeling line button associated with said particular line appearance, said remainder of said information being call history information,
   wherein said caller identification information and said call history information is displayed prior to a user answering the call and according to preferences set by said user including an order of data to be displayed within each of the displayed informations for the call; and
   displaying an indication of availability of said call history information on a main display of said telephone appliance, and displaying said call history information on said main display in response to user selection of said indication of availability.

5. The method of claim 4, wherein said information includes at least one of Caller Line Identification (CLID) and Terminating Line Identity (TLI), button directory number (DN), telephone directory number (DN), contact information server data, and configuration options.

6. The method of claim 4, wherein said indication of availability is a selectable icon displayed in said main display area.

7. The method of claim 4, wherein said indication of availability comprises illuminating said line button with a predetermined color.

8. A method of displaying call-related predetermined information on a telephone appliance, comprising:

generating a message containing said information and an indication of at least one display area on said telephone for displaying said information;

receiving said message at said telephone appliance and in response displaying an abbreviated portion of said information at a self-labeling line button associated with a particular line appearance of said telephone;

pressing a user input key to display a remainder of said information at said self-labeling line button, said remainder of said information being call history information, wherein said caller identification information and said call history information is displayed prior to a user answering the call and according to preferences set by said user including an order of data to be displayed within each of the displayed informations for the call; and displaying an indication of availability of said remainder of said information on a further display area of a main display of said telephone appliance, and displaying said remainder of said information on said further display area of said main display in response to user selection of said indication of availability.

9. The method of claim 8, wherein said abbreviated portion of said at least one display area is a self-labeling line button associated with a particular line appearance of said telephone appliance.

10. The method of claim 8, wherein said information includes at least one of Caller Line Identification (CLID) and Terminating Line Identity (TLI) button directory number (DN), telephone directory number (DN), contact information server data, and configuration options.

11. The method of claim 8, wherein said indication of availability is a selectable icon displayed in said main display area.

12. The method of claim 8, wherein said indication of availability comprises illuminating said line button with a predetermined color.

* * * * *